U S007175277B2

(12) United States Patent
Shinohara et al.

(10) Patent No.: US 7,175,277 B2
(45) Date of Patent: Feb. 13, 2007

(54) GENERATION SYSTEM OF DESIGN DATA, GENERATION METHOD OF DESIGN DATA, RECORDING MEDIUM AND PROGRAM

(75) Inventors: Toshihide Shinohara, Nagano (JP); Tadashi Kaga, Nagano (JP); Kazutoshi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 10/905,730

(22) Filed: Jan. 18, 2005

(65) Prior Publication Data
US 2005/0157258 A1 Jul. 21, 2005

(30) Foreign Application Priority Data
Jan. 19, 2004 (JP) ............................. 2004-010519

(51) Int. Cl.
*G02C 7/06* (2006.01)
*G06F 19/00* (2006.01)
(52) U.S. Cl. ........................................ 351/177; 700/97
(58) Field of Classification Search ................ 351/169, 351/177; 700/97
See application file for complete search history.

(56) References Cited

U.S. PATENT DOCUMENTS 5,886,766 A * 3/1999 Kaga et al. ................. 351/169
6,366,823 B1 * 4/2002 Shirayanagi ................. 700/97

FOREIGN PATENT DOCUMENTS

| JP | 2002-122825 A | 4/2002 |
| JP | 2002-323681 A | 11/2002 |
| JP | 2004-004436 A | 1/2004 |
| JP | 2004-109813 A | 4/2004 |

\* cited by examiner

*Primary Examiner*—Scott J. Sugarman
(74) *Attorney, Agent, or Firm*—Sughrue Mion, PLLC (57) ABSTRACT

A central processing unit of a calculation server apparatus includes a reference design data selection unit for selecting reference design data from a plurality of reference design data stored in reference design data storage of storage memory, and an arrange design unit 123 for processing the reference design data so acquired on the basis of prescription data. The reference design data has point groups having coordinates of points and obtained by dividing a progressive surface as a reference into a lattice form.

14 Claims, 7 Drawing Sheets

GENERATION SYSTEM OF DESIGN DATA, GENERATION METHOD OF DESIGN DATA, RECORDING MEDIUM AND PROGRAM

This application claims priority from Japanese Patent Application No. JP 2004-010519 filed on Jan. 19, 2004 in the Japanese Patent Office, the disclosure of which is incorporated herein by reference.

BACKGROUND OF THE INVENTION

1. Field of the Invention

This invention relates to the generation system of design data, a generation method of design data, a recording medium and a program.

2. Description of the Related Art

Eyeglasses using inner surface progressive addition lenses as a far-and-near glass lens have been used in recent years when accommodation power of eyes drops due to presbyopia or the like. This inner surface progressive addition lens is a lens having different power. For example, an upper portion of the lens is a distance portion for seeing distances, a lower portion is a near portion for seeing near distances and a portion between the distance portion and the near distance portion is a progressive portion in which power progressively changes. Curvatures constituting the distance portion, the near portion and the progressive portion are imparted to an inner surface (progressive surface) positioned on the eyeball side as described, for example, on pages 2–5 of JPA-A-2002-122825, the entire disclosure of which is incorporated herein by reference.

A generation method of design data of such an inner surface progressive addition lens uses, for example, a three-dimensional function expressing a cubic surface such as a high order polynomial. A method that forms a power area for a distance portion (distance portion), a power area for a progressive portion (progressive portion) and a power area for a near portion (near portion) in the function and creates a necessary progressive surface by parameters is available as described in JP-A-2002-122825.

The shape of the progressive surface of the inner surface progressive addition lens varies depending on prescription data of the lens (such as spherical power, cylindrical power, cylinder axis, addition power, etc) and individual lenses must be designed in accordance with the prescription data. The design method described above acquires the prescription data, calculates the distribution of power and the curvature on the basis of the prescription data and calculates the function. However, there remains the problem that generation of the design data is time consuming.

SUMMARY OF THE INVENTION

Therefore, it is an object of the invention to provide a generation system of design data, a generation method of design data, a recording medium and a program each capable of quickly generating design data of an inner surface progressive addition lens.

A generation system of design data according to an exemplary embodiment of the invention is a generation system of design data for generating design data of an inner surface progressive addition lens which includes a distance portion and a near portion each having different powers and a progressive portion whose power progressively changes between the distance portion and the near portion and in which curvatures for constituting the distance portion, the near portion and the progressive portion are imparted to a progressive surface as an inner surface positioned on the side of an eyeball, and this generation system comprises prescription data acquisition unit for acquiring prescription data containing optical characteristics of the inner surface progressive addition lens; reference design data storage memory for storing a plurality of reference design data corresponding to addition power of the inner surface progressive addition lens; reference design data selection unit for selecting reference design data from among the plurality of reference design data stored in the reference design data storage memory on the basis of the prescription data acquired by the prescription data acquisition unit; and an arrange design unit for processing the selected reference design data on the basis of the prescription data; wherein the reference design data stored in the reference design data storage memory includes a point group having coordinates of lattice points prepared by dividing the progressive surface as a reference into a lattice form.

Here, the reference design data stored in the reference design data storage memory is designed on the basis of reference design parameters such as addition power, a progressive corridor length, a width of the progressive corridor, and so forth.

The design data finally generated by the design data generation system according to an exemplary embodiment of the invention may be design data that is constituted by point groups, a design data obtained by conducting surface interpolation of the design data of the point groups and a design data obtained by converting the design data subjected to surface interpolation to an NC processing program. When the surface-interpolated design data and the design data of the NC processing program are acquired, a function for surface-interpolating the point groups and a function for processing the surface-interpolated data to the NC processing program may be provided to the generation system of the design data.

According to an exemplary embodiment of the invention described above, the reference design data storage memory stores a plurality of reference design data corresponding to addition power, and the reference design data is selected and processed on the basis of this prescription data. Therefore, the time necessary for generating the design data can be reduced in comparison with the prior art in which the design data is generated from the beginning. Consequently, the design data can be quickly generated.

When the progressive surface is determined by a three-dimensional function such as a higher order polynomial, freedom of design is sometimes limited by the function used, so that a smooth progressive surface cannot be constituted. According to an exemplary embodiment of the invention, in contrast, the progressive surface as the reference is dived into a lattice form and the arrange design unit processes the coordinates of the point groups on the basis of the point groups constituted by coordinates of the lattice points. A curve surface formula is constituted for each lattice surface divided by the lattices in the point groups so arranged and surface interpolation may well be conducted. When surface interpolation is conducted, a curve surface formula may well be determined so as to establish continuity at the boundary of each lattice surface. Because the exemplary embodiment of the invention generates the design data in this way on the basis of the point groups, a smooth progressive surface can be obtained.

An exemplary embodiment of the invention preferably further includes a comparison judgment means for acquiring a measurement result of optical characteristics of the inner progressive addition lens processed, and comparing and judging the measurement result with the prescription data or inspection data based on the prescription data; and a compensation design unit for compensating the design data processed by the arrange design unit on the basis of a difference when the difference between the prescription data or the inspection data based on the prescription data and the measurement result is judged as being greater than a predetermined value by the comparison judgment unit.

Because an exemplary embodiment of the invention includes the compensation design unit for compensating the design data on the basis of the difference between the measurement result of the optical characteristics of the inner surface progressive addition lens and the prescription data or the inspection data based on the prescription data, more accurate design data can be generated.

It may be conceivable to directly reflect a compensation value on the design parameter and to directly generate the design data from the design parameter when the design data is compensated. In this case, however, generation of the design data reflecting the compensation is troublesome. In contrast, an exemplary embodiment of the invention compensates the design data processed by the arrange design unit. Therefore, the compensated design data can be more quickly generated in comparison with the case where the data is generated from the beginning.

Because the design data designed by the arrange design unit is compensated, the design data can be compensated without depending on the kind of programs for generating the reference design data from the design parameter.

A preferred embodiment further comprises an inspection data generation unit for generating inspection data used for the inspection of the inner surface progressive addition lens on the basis of the design data described above.

Because of the inspection data generation unit for generating the inspection data, approval/rejection judgment as to whether or not the inner surface progressive addition lens has desired characteristics can be easily made when the inner surface progressive addition lens is practically produced.

When the actual measurement value and the prescription data are different depending on the characteristics of the measurement apparatus for inspecting the inner surface progressive addition lens, the inspection can be made more accurately by generating the inspection data that anticipates the actual measurement value.

A preferred embodiment includes an eccentricity design unit for rendering a design center of the progressive surface eccentric after the reference design data is processed by the arrange design unit.

It is particularly preferred that the eccentricity design unit renders the design center of the progressive surface eccentric by a predetermined distance and then compensates a prismatic amount.

When the design center of the progressive surface is in agreement with the geometric center of the inner surface progressive addition lens, there is sometimes the case where the inner surface progressive addition lens cannot be edged into the shape of the eyeglass frame depending on the interpupillary distance of a user and on the shape of the frame when the lens is put into the eyeglass frame.

In such a case, the design center of the progressive surface can be rendered eccentric because of the eccentricity design unit, and edging can be made.

When the progressive surface is practically processed without making the eccentricity design, an inner surface progressive addition lens having an eccentric progressive surface can be produced by fitting eccentrically a semi-finished lens to a shape creation apparatus. In this case, deviation occurs during shape creation and processing accuracy is likely to drop because the semi-finished lens is eccentrically fitted to the shape creation apparatus.

In contrast, because of the eccentricity design, the semi-finished lens need not be eccentrically fitted to the shape creation apparatus and a drop in processing accuracy during shape creation can be prevented.

A preferred embodiment includes a new reference design data generation data for generating new reference design data and causing the reference design data storage memory to store the new reference design data.

By having the new reference design data generation unit, reference design data can be generated having a different progressive corridor length and a different width of the progressive corridor and can add them to the reference design data storage memory, for example. Because the reference design data can thus be increased, variation of the inner surface progressive addition lens can be expanded.

The preferred embodiment of the invention can be constituted not only into the generation system of design data described above but also into a generation method of design data, a computer-readable recording medium recording a program for executing the generation method of the design data and a program for causing a computer to execute the generation method of the design data, as those skilled in the art will readily understand and can enjoy the same operation and effect as those described above.

DETAILED DESCRIPTION OF THE PREFERRED EMBODIMENT

Preferred embodiments of the invention will be hereinafter explained with reference to the drawings.

Figure 1:
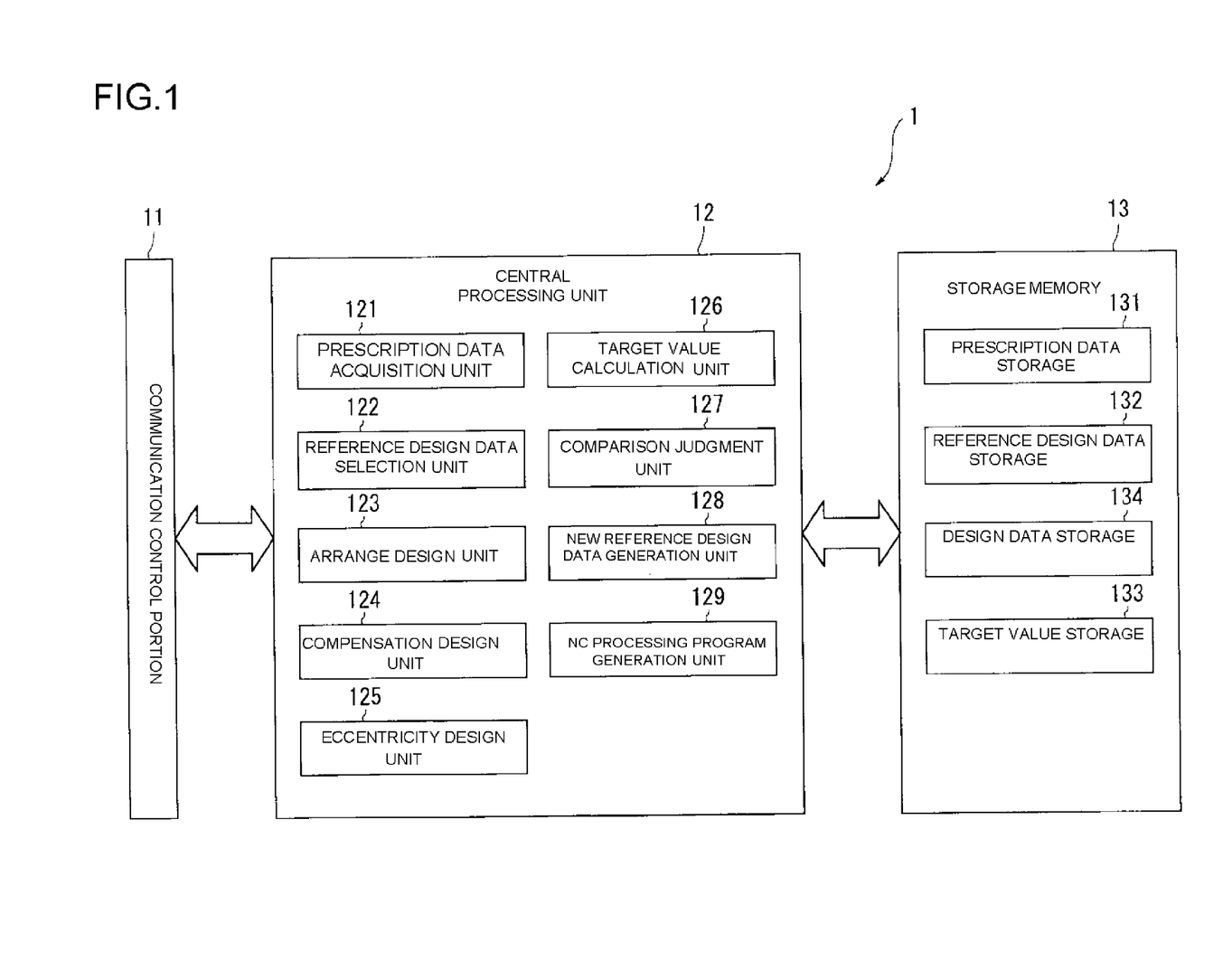
FIG. 1 is a block diagram showing a generation system of design data according to an embodiment of the invention.

FIG. 1 shows a generation system of design data according to a preferred embodiment. This generation design data generation system is for generating design data of an inner surface progressive addition lens L.

Figure 2A:
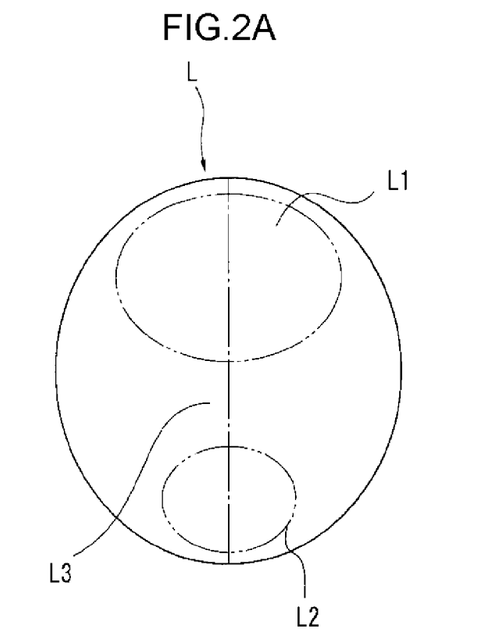
FIG. 2 is a schematic view showing an inner surface progressive addition lens.

As shown in FIG. 2A, the term "inner surface progressive addition lens L" represents a lens that includes a distance portion L1 and a near portion L2 having mutually different powers and a progressive portion L3 whose power progressively changes between the distance portion L1 and the near portion L2, wherein curvatures constituting the distance portion L1, the near portion L2 and the progressive portion L3 are applied to an inner surface (progressive surface) L4

Figure 2B:
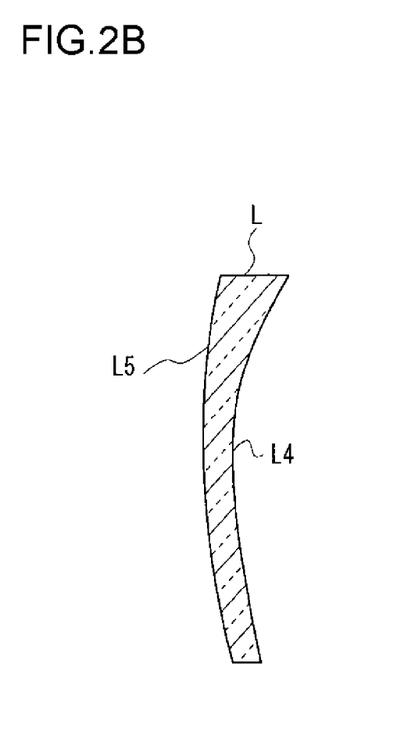

(FIG. 2B) positioned on the side of an eyeball. Incidentally, an outer surface L5 is a spherical surface.

Such an inner surface progressive addition lens L is acquired by picking up a semi-finished lens (an unfinished lens having a substantially circular shape and a thickness greater than that of inner surface progressive addition lens L as a finished product) and processing and shaping the semi-finished lens into the product shape on the basis of the design data.

A generation system of design data includes a communication control portion 11 as part of a calculation server apparatus 1, for executing input/output control of data, a central processing unit 12 constituted by a CPU, etc, for executing various programs and storage memory 13 constituted by a hard disk or a memory for storing the data.

The central processing unit (CPU) 12 includes various elements that may be implemented with software, hardware, and/or firmware as is known to those skilled in the art. The CPU 12 includes a prescription data acquisition unit 121 as, for example, a program expanded on an OS (Operating System) for controlling the operation of the CPU, a reference design data selection unit 122, an arrange design unit 123, a compensation design unit 124, an eccentric design unit 125, a target value calculation unit 126 as an inspection data generation unit, a comparison judgment unit 127, a new reference design data generation unit 128 and an NC processing program generation unit 129.

The prescription data acquisition unit 121 acquires the prescription data containing optical characteristic information among the data inputted from a communication control portion 11. The prescription data is stored in prescription data storage means 131 of the storage memory 13. Here, the prescription data represents that information which contains spherical power, cylindrical power, cylinder axis, addition power, interpupillary distance, and so forth.

Incidentally, the calculation server apparatus 1 is connected to an order acceptance server apparatus not shown. The order acceptance server apparatus allocates an order acceptance number to the prescription data, etc, and the prescription data is inputted from the order acceptance server apparatus to the communication control portion 11 through a communication line such as a LAN.

Figure 3:
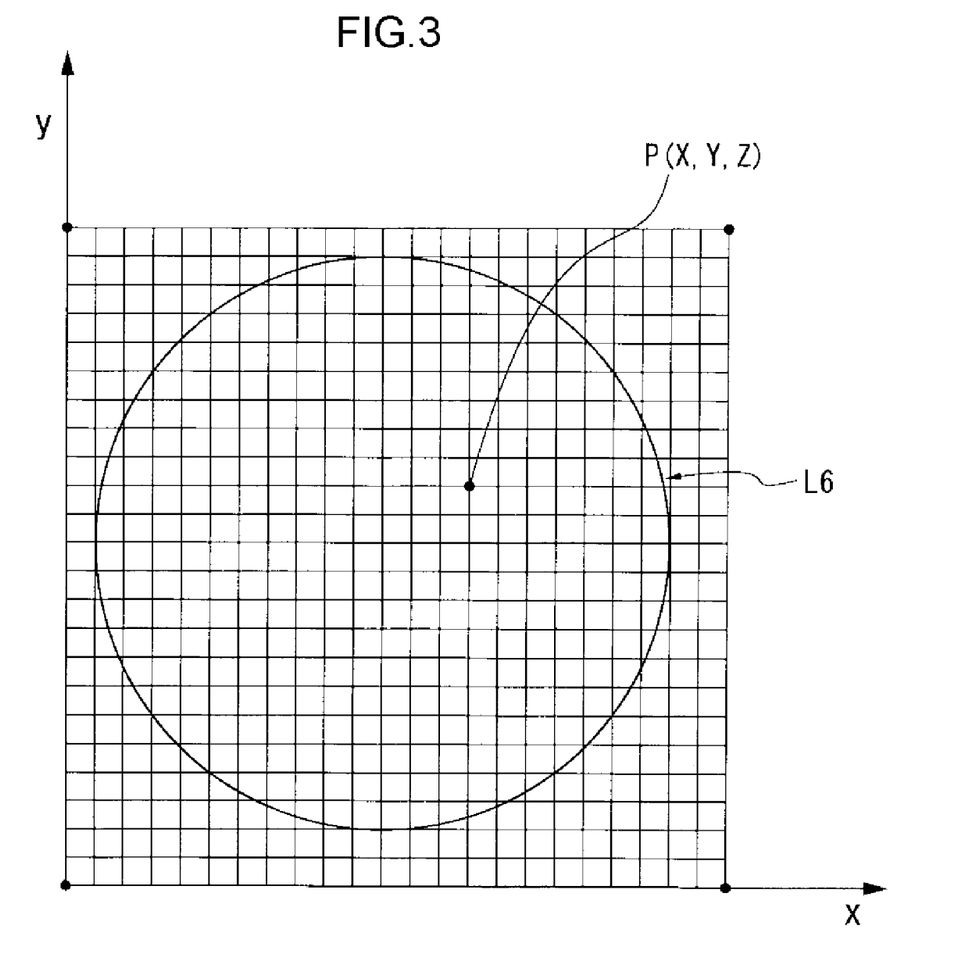
FIG. 3 is a view showing the state where a progressive surface is divided into a lattice form.

The reference design data selection unit 122 selects the reference design data from a plurality of reference design data stored in the reference design data storage 132 of the storage memory 13 on the basis of addition power of the prescription data acquired by the prescription data acquisition unit 121. This reference design data has point groups of three-dimensional coordinates data of lattice points P (X, Y, Z) prepared by dividing a progressive surface L6 as a reference into a lattice form as shown in FIG. 3.

The arrange design means 123 processes the reference design data acquired by the reference design data selection unit 122 on the basis of prescription data and changes the design.

For example, the arrange design unit 123 changes the design of the curvatures of the progressive surface (surface on the eyeball side) of the reference design data on the basis of the spherical power as one of the prescription data. The value Z at an arbitrary lattice point (X, Y, Z) of the progressive surface of the inner surface progressive addition lens L can be obtained on the basis of this design change.

In other words, the Z value is expressed by the following formula (1).

Assuming that an axis extending from the object side to the eyeball side and passing through the center of the progressive surface (surface on the eyeball side) is a Z axis, an axis extending from below to up and orthogonally crossing the Z axis is a Y axis and an axis extending from the left to the right and orthogonally crossing the Z axis is an X axis, X and Y of an arbitrary point (X, Y, Z) represent arbitrary coordinates of the X and Y coordinates of the surface on the eyeball side and Z represents the Z coordinates of the surface on the eyeball side.

[Expression 1]

$$Z = \frac{(Cp+Cx)X^2 + (Cp+Cy)Y^2}{1 + \sqrt{(1-(Cp+Cx)^2 X^2 - (Cp+Cy)^2 Y^2)}} \quad (1)$$

Here, the progressive surface can be obtained by synthesizing an original progressive refractive surface that is solely directed to allow the surface on the eyeball side to exhibit desired progressive sight correction performance and an original toric surface that is solely directed to allow the surface on the eyeball side to exhibit desired astigmatism correction performance.

Symbol Cp represents an approximate curvature as a mean curvature in a radial direction of the original progressive surface described above. Symbol Cx represents a curvature in the X axis direction of the original toric surface and symbol Cy represents a curvature in the Y axis direction of the original toric surface.

Cx is expressed by the following formula (2).
[Expression 2]

$$Cx = \frac{(Csf - S - Cb)}{(n-1)} \quad (2)$$

Symbol Cb represents the curvature of a surface of the reference data on the object side, that is, the surface on the outer surface side (base curve) and symbol Csf represents the curvature (base curve) of the surface of the semi-finished lens on the outer surface side. Symbol n represents the refractive index of a semi-finished lens, and symbol S represents the spherical power of the prescription data.

Cy is expressed by the following formula (3).
[Expression 3]

$$Cy = \frac{(Cx + Ct)}{(n-1)} \quad (3)$$

Symbol Ct represents the curve for astigmatism.

The design data so designed is stored in the design data storage 134 of the storage memory 13.

Incidentally, when it is known in advance that the design data designed by the arrange design unit 123 needs compensation, the data designed by the arrange design unit 123 may be compensated in advance by compensation design unit 124 that will be later described. For example, the data designed by the arrange design unit may be compensated in advance by the later-appearing compensation design unit 124 in accordance with the condition of a machine tool main body 32 (see FIG. 8) of an NC machine tool 3.

Eccentricity design unit 125 is for making the design center of the progressive surface designed by the arrange design unit 123 eccentric. The eccentricity design unit 125 acquires shape information of an eyeglass frame among the data transmitted from the order acceptance server apparatus not shown and reads out the prescription data stored in the prescription data storage 131 of the storage memory 13. The eccentricity design unit 125 judges whether or not eccentric design is necessary on the basis of the interpupillary distance and the shape of the eyeglass frame contained in the prescription data.

Figure 4:
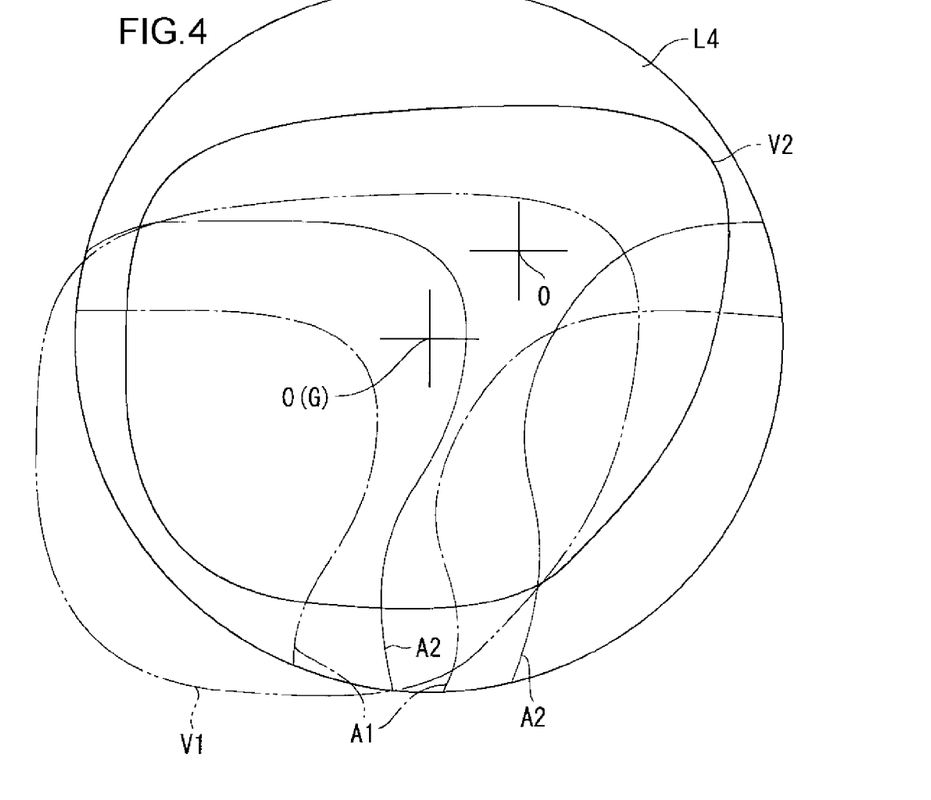
FIG. 4 is a schematic view showing an outline of eccentricity design.

When the design center O of the progressive surface L4 is in agreement with the geometric center G of the inner surface progressive addition lens L as shown in FIG. 4, for example, it is not possible in some cases to edge the inner surface progressive addition lens L into the shape of the eyeglass frame depending on the interpupillary distance of a user and on the frame shape when the inner surface progressive addition lens L is processed and is put into the eyeglass frame. In other words, when the inner surface progressive addition lens L is processed into the shape of the eyeglass frame, an outer shape V1 (indicated by two-dot-chain line in FIG. 4) of the eyeglass lens swells out in some cases from the inner surface progressive addition lens L. In such a case, the design center O of the progressive surface L4 is allowed to be eccentric by a predetermined distance lest the outer shape V2 of the eyeglass lens swells out from the inner surface progressive addition lens L as indicated by solid line in FIG. 4. Incidentally, symbol A1 in FIG. 4 represents an aberration curve before eccentricity is created and A2 represents an aberration curve after eccentricity is created.

Figure 5A:
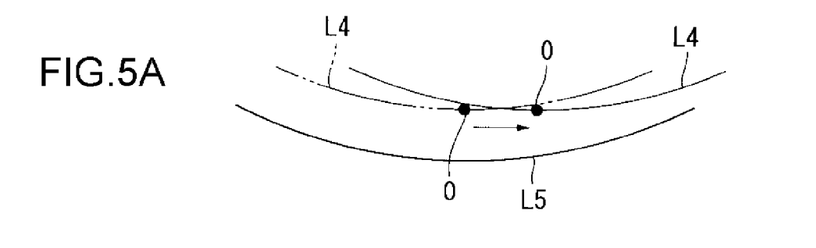
FIG. 5 is a schematic view showing means of eccentricity design.
Figure 5B:
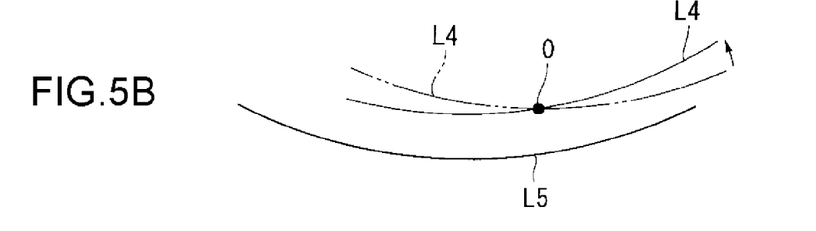

Here, the eccentricity design method includes the following method. For example, the design center O of the progressive surface L4 is moved by a predetermined distance in a horizontal direction to create eccentricity as shown in FIG. 5A. Next, the progressive surface L4 is rotated by a predetermined angle in a direction indicated by an arrow to return the prismatic amount as shown in FIG. 5B.

Figure 6:
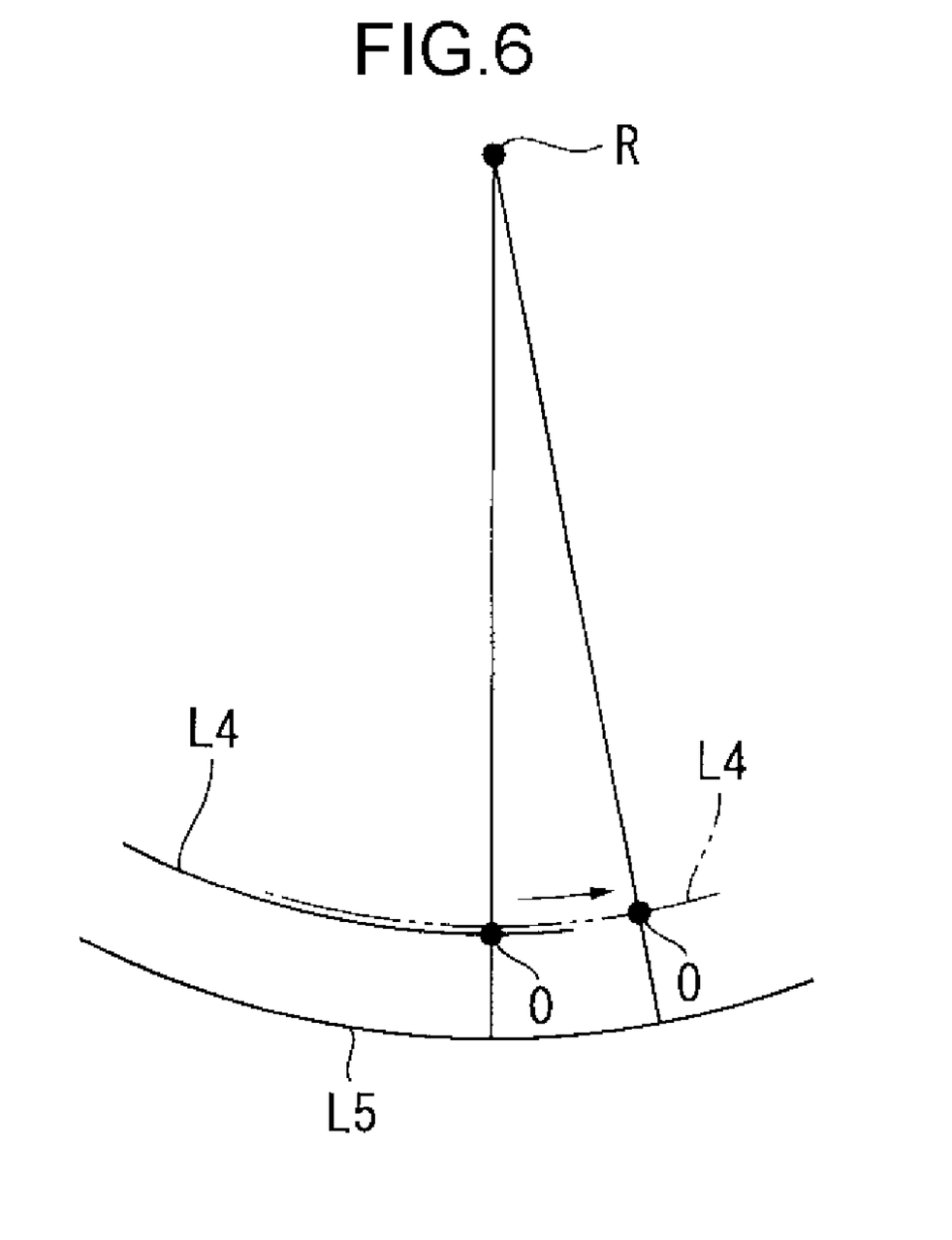
FIG. 6 is a schematic view showing another means of eccentricity design.

There is another method that determines the center R of the curve of the outer surface L5 and rotates and moves the progressive surface L4 and the outer surface L5 on the basis of this center R as the reference as shown in FIG. 6.

The target value calculation unit 126 is an inspection data generation unit for generating inspection data of the inner surface progressive addition lens L. The target value calculation unit 126 conducts surface interpolation of design data constituted by the point groups designed by the arrange design means 123 (or design data eccentrically designed by the eccentricity design means 125) and anticipates and calculates the measurement value in a lens meter of the inner surface progressive addition leans L by using a beam tracing method.

Since the progressive surface L4 of the inner surface progressive addition lens L is an aspherical surface, the visual line and the progressive surface L4 do not orthogonally cross each other when the user wears the eyeglass in practice. To make measurement by using the lens meter, however, measurement is conducted by causing the optical axis to orthogonally cross the progressive surface L4. Therefore, a difference occurs between the value of the prescription data and the measurement value. To cope with this difference, the measurement value of the inner surface progressive addition lens L by the lens meter is in advance anticipated and calculated, and this target value is used as the inspection data.

Assuming, for example, that the prescription of the inner surface progressive addition lens L is such that spherical power S is +4D, cylindrical power C is −2D and a cylinder axis C is 10 degrees at the near portion L2, the target values are, for example, spherical power S of +4.1D, cylindrical power C of −1.7D and the cylinder axis of 10 degrees.

The target values calculated by the target value calculation unit 126 are stored in the target value storage 133 of the storage memory 13.

The comparison judgment means 127 acquires the measurement value (actual measurement value) of the inner surface progressive addition lens L processed and compares the target value calculated by the target value calculation unit 126 with the actual measurement value. The comparison judgment unit 127 calculates the difference between the actual measurement value and the target value and judges whether or not the difference is below a predetermined value. The comparison judgment unit 127 confirms power of the distance portion L1 of the inner surface progressive addition lens L or power of both distance and near portions L1 and L2 and compares them with the target values.

The compensation design unit 124 compensates the design data when the comparison judgment means 127 judges that the error between the target value and the actual measurement value exceeds the predetermined value.

It will be assumed that the compensation amount (difference amount) of the curvature in the X axis direction of the distance portion L1 is Cdx, the compensation amount of the curvature in the Y axis direction of the distance portion L1 is Cdy, the compensation amount (difference amount) of the curvature in the X axis direction of the near portion L2 is Cnx, the compensation amount of the curvature in the Y axis direction of the near portion L2 is Cny, the center coordinates of the distance portion L1 are (Xd, Yd) and the center coordinates of the near portion L2 are (Xn, Yn).

In this case, the compensation amounts Cpx and Cpy of the progressive portion L3 are given by the following formulas (4) and (5).

[Expression 4]

$$Cpx = \frac{(Cnx - Cdx)}{(Yn - Yd)} \times (Y - Yd) + Cdx \qquad (4)$$

[Expression 5]

$$Cpy = \frac{(Cny - Cdy)}{(Yn - Yd)} \times (Y - Yd) + Cdy \qquad (5)$$

Here, symbol Y represents the value of the position requiring the compensation amount in the Y coordinates.

The compensation amounts of the Z coordinates can be calculated by substituting these compensation amounts (Cdx, Cdy, Cnx, Cny, Cpx, Cpy) for Cx and Cy in the formula (1), respectively.

The new reference design data generation unit 128 acquires reference design parameters for generating new reference design data and generates the new reference design data.

For example, the new reference design parameter generation unit 128 acquires a new progressive corridor length and the width of the progressive corridor as reference design parameters and generates the new reference design data on the basis of these data. The data acquired by the new reference design data generation unit 128 is stored in the reference design data storage means 132.

The NC processing program generation unit 129 converts the design data designed by the arrange design unit 123 (or the data processed by the eccentricity design unit 125 or the compensation design unit 124) to the NC processing program as numerical value control instruction data. In the design data constituted by the point group data, for example, surface interpolation is conducted by determining a curve surface formula of each lattice surface and the NC processing program is generated. Curve surface interpolation using a Bezier curve or a secondary spline function can be cited as the method for surface interpolation. When surface interpolation is conducted, the curve surface formula may well be determined so that the surface continues at the boundary of each lattice surface. In the curve surface formula of each lattice surface, for example, curve surface interpolation may be determined so that the secondary derived function, too, continues at the boundary of each lattice surface.

The storage memory 13 includes prescription data storage 131, reference design data storage 132, design data storage 134 and target value storage 133.

The prescription data storage 131 stores the prescription data acquired by the prescription data acquisition unit 121 of the central processing unit 12. The prescription data is stored in association with the order acceptance number accepted by the order acceptance server apparatus.

The reference design data storage 132 stores a plurality of reference design data of the inner surface progressive addition lens L corresponding to a plurality of addition power. For example, the reference design data storage 132 stores the reference design data corresponding to each addition power which increases by 0.25D within the range of 0.50D to 3.50D.

Such reference design data is constituted on the basis of the design parameters such as addition power, the progressive corridor length, the change of the power of the progressive corridor, the width of the progressive corridor, and so forth.

The design data storage 134 stores the design data designed by the arrange design means 123, the design data eccentrically designed by the eccentricity design unit 125 and the design data compensated by the compensation design unit 124. Such design data are stored in association with the order acceptance numbers allocated by the order acceptance server apparatus.

The target value storage 133 stores the target value calculated by this target value calculation unit 126 and stores the target value in association with the order acceptance number allocated by the order acceptance server apparatus.

The calculation server apparatus 1 described above generates in the following way the design data of the inner surface progressive addition lens L. Description will now be made with reference to FIG. 7.

Figure 7:
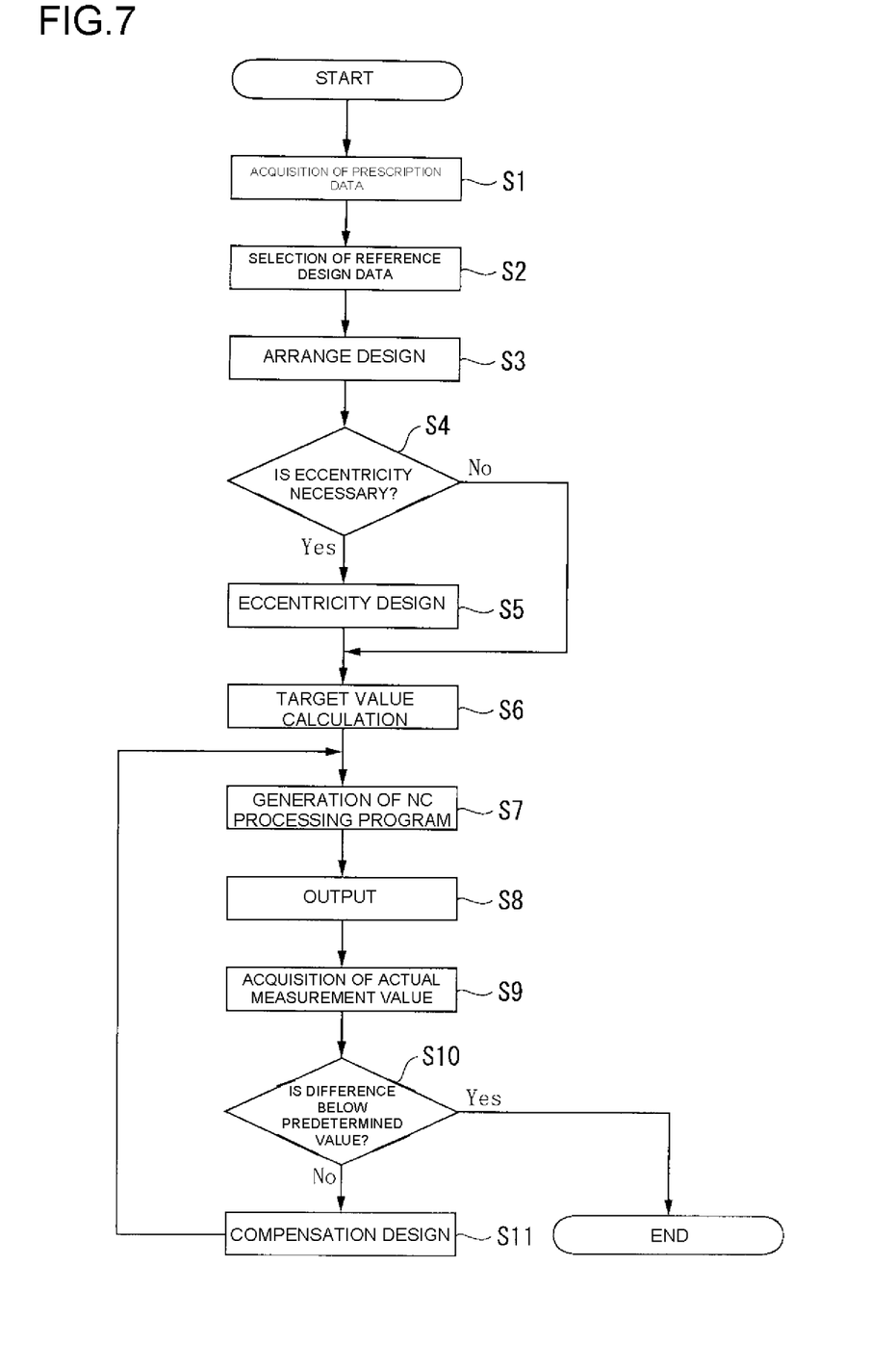
FIG. 7 is a flowchart showing a generation method of design data.

First, the user receives optometry and selects the eyeglass frame at a retail shop of eyeglasses, etc, and the order acceptance server apparatus acquires the data and allocates the order acceptance number.

The prescription data acquisition unit 121 of the calculation server apparatus 1 acquires the prescription data from among the information transmitted from the order acceptance server apparatus and the prescription data storage 131 stores the prescription data (prescription data acquisition step; Step S1). The reference design data selection unit 122 selects the reference design data from the reference design data storage 132 (reference design data selection step; Step S2) on the basis of addition power contained in this prescription data. The arrange design unit 123 processes the selected reference design data on the basis of the prescription data (arrange design step; Step S3).

Next, the eccentricity design unit 125 acquires the prescription data and the frame shape information of the eyeglass lens and judges whether or not eccentric design is necessary on the basis of this data (eccentricity judgment step; Step S4). When the eccentric design is judged as being necessary, the eccentricity design unit 125 conducts the eccentric design (eccentricity design step; Step S5).

Incidentally, when the eccentricity design unit 125 conducts the eccentricity design, the design data storage 134 stores the design data after the eccentricity design. When the eccentricity design unit 125 does not conduct the eccentricity design, the design data storage 134 stores the design data processed by the arrange design unit 123.

The target value calculation unit 126 reads out the prescription data stored in the prescription data storage 131 and calculates the target value (target value calculation step; Step S6).

The NC processing program generation unit 129 processes the design data generated in the manner described above to the NC processing program (NC processing program step; Step S7).

Figure 8:
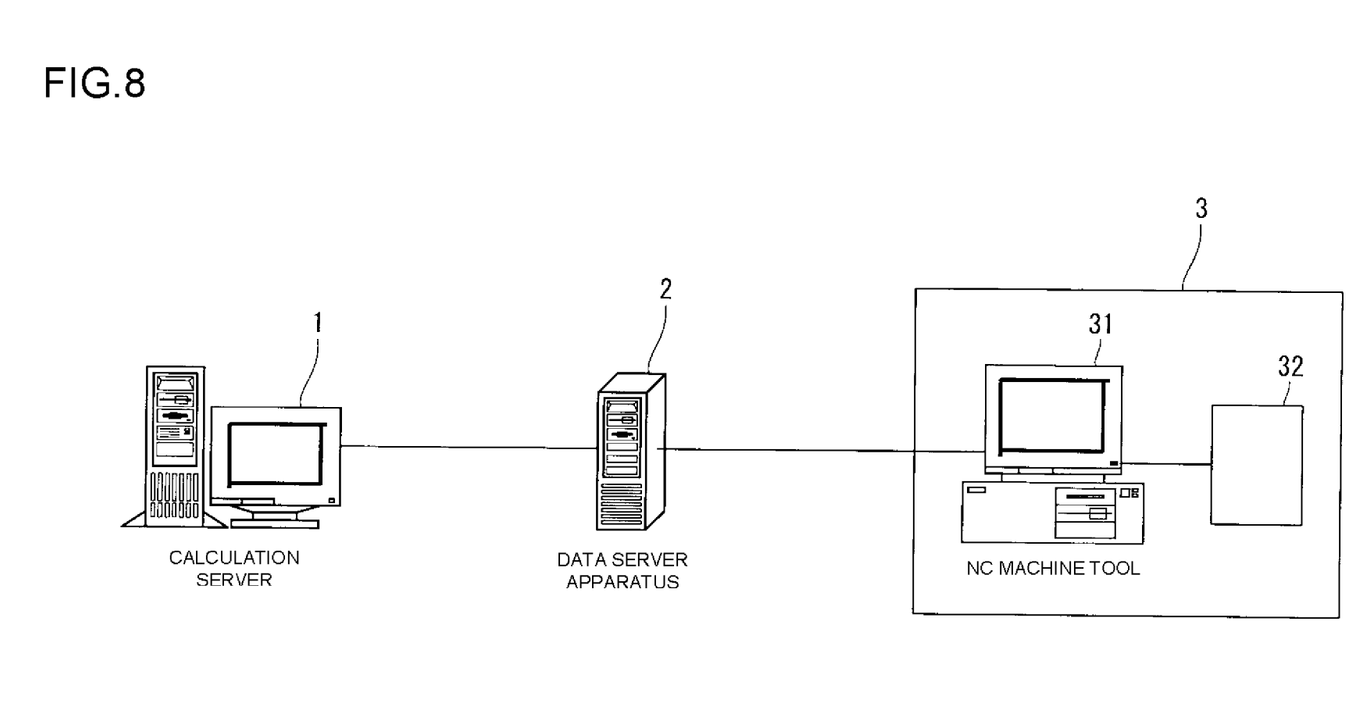
FIG. 8 is a schematic view showing a relation among a calculation server apparatus, a data server apparatus, an NC machine tool, and so forth.

The NC processing program obtained as described above and the target value are outputted to the data server apparatus 2 shown in FIG. 8 (output step; Step S8).

The NC processing program so generated is built up in the data server apparatus 2 connected to the calculation server apparatus 1.

Incidentally, the NC processing program is constituted by a series of instruction blocks and contains path information, speed information, and so forth. The path information is information that instructs a predetermined movement trajectory and has G codes for designating preparation functions such as linear interpolation, arc interpolation and temporary stop. The speed information has F codes for designating a feed speed.

The data server apparatus 2 is connected to the NC machine tool 3. The NC machine tool 3 includes a numerical value control apparatus 31 and a machine tool main body 32.

The machine tool main body 32 includes an X axis servo system, a Y axis servo system and a Z axis servo system for moving the tool in the X axis direction, the Y axis direction and the Z axis direction, respectively, and has a driving system such as a main shaft driver for rotating a main shaft, whenever necessary.

The numerical value control apparatus 31 analyzes the NC processing program read from the data server apparatus 2, calculates the moving distance and the moving speed of the tool (not shown) of the machine tool main body 32 and outputs them to the machine tool main body 32. In consequence, the tool of the machine tool main body 32 is driven and controlled and the inner surface progressive addition lens L is processed.

Next, the inner surface progressive addition lens L processed is inspected. More concretely, the inner surface progressive addition lens L is measured with a lens meter and the actual measurement values (spherical power, cylindrical power, cylinder axis, addition power, etc.) are obtained. The actual measurement values are inputted to an inspection terminal. The inspection terminal is connected to the calculation server apparatus 1 through a network not shown. The actual measurement value is acquired by the comparison judgment unit 127 of the calculation server apparatus 1 through the network (Step S9).

The comparison judgment unit 127 compares the target value calculated by the target value calculation unit 126 with the actual measurement value, calculates the difference between the actual measurement value and the target value and judges whether or not the difference is below the predetermined value (comparison judgment step; Step S10).

When the difference is below the predetermined value, the desired inner surface progressive addition leans L is judged as being produced and the production of the inner surface progressive addition lens L is finished.

When the difference exceeds the predetermined value, the compensation design unit 124 reads out the design data stored in the design data storage 134 and compensates the design data (compensation design step; Step S11). Incidentally, the design data so compensated is stored in the design data storage 134.

The NC processing program generation unit 129 processes the compensated design data into the NC processing program (Step S7) and outputs the program to the data server apparatus 2 (Step S8), so that the NC processing program inside the data server apparatus 2 is updated. Re-processing of the inner surface progressive addition lens L is conducted on the basis of the compensated NC processing program, re-inspection is made and the comparison judgment unit 127 conducts judgment (Step S9). The comparison judgment unit 127 repeats Steps S7 to S11 until the difference between the target value calculated by the target value calculation unit 126 and the actual measurement value becomes smaller than the predetermined value.

Consequently, this embodiment can provide the following advantages.

(1) The reference design data storage 132 of the storage memory 13 of the calculation server apparatus 1 stores a plurality of reference design data corresponding to addition power and the calculation server apparatus 1 selects and processes the reference design data on the basis of the prescription data. Therefore, the embodiment can shorten the time required for generating the design data in comparison with the prior art in which the design data is generated from the beginning, and can quickly generate the design data.

(2) When the progressive surface is determined by a three-dimensional function such as a higher order polynomial, freedom of design is sometimes limited by the function employed and a smooth progressive surface cannot be constituted in consequence.

According to this embodiment, in contrast, the progressive surface as the reference is divided into the lattice form, and the arrange design means 123 processes the coordinates of the point groups on the basis of the point groups including the coordinates of the lattice points. A curve surface formula is constituted for each lattice surface divided by the lattices in the point groups arranged and surface interpolation is conducted. When surface interpolation is conducted, the curve surface formula may well be determined so that the surface continues at the boundary of each lattice surface. Since design is made in this way on the basis of the point groups in the embodiment, the smooth progressive surface can be constituted.

(3) The calculation server apparatus 1 has the compensation design unit 124 for compensating the design data on the basis of the difference between the measurement result of the optical characteristics of the inner surface progressive addition lens L and the target value as the inspection data based on the prescription data. Therefore, the compensated design data can be generated and the inner surface progressive addition lens L can be processed as desired.

(4) To compensate the design data, it would be conceivable to directly reflect the difference from the target value as the inspection data based on the prescription data on the design data and to directly generate the design data from this design parameter but in this case, generation of the design data reflecting the compensation is troublesome. In this embodiment, in contrast, the compensation design unit 124 compensates the design data designed by the arrange design unit 123 and the design data eccentrically designed by the eccentricity design unit 125. Therefore, the design data quickly compensated can be generated in comparison with the case where the data is regenerated from the beginning.

Because the design data designed by the arrange design unit 123 and the design data eccentrically designed by the eccentricity design means 125 are compensated, compensation can be made without depending on the kind of the program generating the reference design data from the design parameter.

(5) In the embodiment, the calculation server apparatus 1 has the target value calculation unit 126 for calculating the target value as the inspection data and can calculate the target value. Consequently, whether or not the inner surface progressive addition lens L has desired optical characteristics and should be approved or rejected can be determined easily and correctly.

In other words, because the progressive surface L4 has the aspherical surface in the inner surface progressive addition lens L according to the embodiment, the visual line and the progressive surface L4 do not orthogonally cross each other when the user wears the eyeglass. In contrast, when the measurement is made by use of the lens meter, the measurement is made while the optical axis is so set as to orthogonally cross the progressive surface L4 with the result that the difference occurs between the value of the prescription data and the measurement value. Therefore, the target value calculation unit 126 anticipates and calculates the measurement value of the inner surface progressive addition lens L with the lens meter and can make inspection more correctly.

(6) Because the calculation server apparatus 1 has the eccentricity design unit 125, the design center O of the progressive surface L4 can be rendered eccentric. When the design center O of the progressive surface L4 is in agreement with the geometric center G of the inner surface progressive addition lens L, there is sometimes the case where the inner surface progressive addition lens L cannot be edged into the shape of the eyeglass frame depending on the interpupillary distance of the user and on the shape of the frame when the inner surface progressive addition leans L is processed and put into the eyeglass frame. Because the calculation server apparatus 1 can make eccentricity design in such a case, edging can be conducted.

The eccentricity design unit 125 judges whether or not the eccentricity design is necessary on the basis of the interpupillary distance contained in the prescription data and on the shape of the glass frame. Therefore, the production of the inner surface progressive addition lens that cannot be edged can be prevented.

(7) An inner surface progressive addition lens having an eccentric progressive surface can be produced by mounting a shape creation apparatus for rendering a semi-finished lens eccentric when processing of the progressive surface is practically conducted without mounting the eccentricity design means 125 to the calculation server apparatus 1 and without executing the eccentricity design.

In this case, however, the semi-finished lens is rendered eccentric and is fitted to the shape creation apparatus. Therefore, a positioning error occurs during shape creation, processing accuracy is likely to drop and there is the possibility that the inner surface progressive addition lens having a desired progressive surface cannot be produced.

In contrast, because the eccentricity design unit 125 in this embodiment executes the eccentricity design, the semi-finished lens need not be fitted under the eccentric state to the shape creation apparatus and the drop of processing accuracy during shape creation can be prevented. In consequence, an inner surface progressive addition lens L having a desired progressive surface can be produced.

(8) Because the calculation server apparatus 1 has the new reference design data generation unit 128, the calculation server apparatus 1 can generate the new reference design data and causes the reference design data storage 132 to store the data. Because the reference design data can be increased in this way, variation of the inner surface progressive addition lens can be expanded.

Incidentally, the invention is not limited to the embodiment described above and those modifications and improvements that can be accomplished within the range capable of accomplishing the objects of the invention are contained in the invention.

For example, the calculation server apparatus 1 has the new reference design data generation unit 128 in the embodiment described above but the new reference design data generation unit 128 may be absent.

The calculation server apparatus 1 has the target value calculation unit 126 for generating the target value as the inspection data in the embodiment described above. However, the invention may well generate an aberration diagram of the inner surface progressive addition lens L as the inspection data without being limited to the target value calculation unit 126. When this method is employed, the inspection can be carried out by comparing the shape of the progressive surface of the inner surface progressive addition lens L produced with an aberration curve of the aberration diagram. The calculation server apparatus 1 may employ a construction not having the inspection data calculation unit for calculating the inspection data.

In the embodiment described above, the calculation server apparatus 1 has the comparison judgment unit 127, acquires the measurement value of the processed inner surface progressive addition lens L and compares and judges this value with the target value calculated by the target value calculation unit 126. However, the comparison judgment unit may well be provided to the inspection terminal, or the like. For example, the calculation server apparatus 1 transmits the target value to the inspection terminal and inputs the measurement value to the inspection terminal, and the inspection terminal conducts comparison judgment and transmits the comparison judgment result to the calculation server apparatus 1.

It is also possible to employ the construction in which the comparison judgment unit is not disposed but the calculation server apparatus 1 outputs the target value to the inspection terminal and the operator compares the actual measurement value with the target value. In this case, however, the operation is troublesome because the operator must conduct comparison judgment. In contrast, because the comparison judgment unit 127 of the calculation server apparatus 1 conducts comparison judgment in the embodiment described above, the burden to the operator can be reduced.

The calculation server apparatus 1 has the eccentricity design unit 125 in the embodiment described above but the eccentricity design unit 125 may well be absent. In this way, the burden to the calculation server apparatus 1 can be reduced.

The calculation server apparatus 1 generates the design data constituted by the point groups, converts the design data to the NC processing program and builds up the program in the data server apparatus 2. However, it is also possible to employ the construction in which the design data constituted by the point groups is built up in the data server apparatus 2 and is converted to the NC processing program by the data server apparatus 2 or the NC machine tool 3. In this way, the operation in the calculation server apparatus 1 can be simplified.

In the embodiment described above, the compensation design unit 124 compensates the design data when the difference between the target value and the actual measurement value exceeds the predetermined value. However, it is further possible to employ the construction in which the compensation design unit 124 compensates (that is, smoothes) the difference when the difference (for example, difference of Z value) at each point in the point groups of the design data to be processed by the arrange design means 123 is great. When the design data the error of which is thus compensated is generated, an optimal inner surface progressive addition leans can be produced.

Each unit of the calculation server apparatus 1 of the embodiment described above reads the program and controls the generation operation of the design data but this construction is not restrictive. For example, hardware such as various logical devices may be used for the construction.

Furthermore, the program constituting each unit of the calculation server apparatus 1 may be provided to a recording medium such as a CD-ROM. When the program is provided in the form of such a recording medium, the design data can be generated economically and simply.

What is claimed is:

1. A system for generating design data of an inner surface progressive addition lens which includes a distance portion and a near portion each having different powers, and a progressive portion whose power progressively changes between said distance portion and said near portion, an inner surface of the progressive addition lens having curvatures respectively corresponding to said distance portion, said near portion and said progressive portion, said system comprising:
a prescription data acquisition unit for acquiring prescription data containing optical characteristics of the inner surface of the progressive addition lens;
a reference design data storage memory for storing a plurality of reference design data corresponding to addition power of the inner surface of the progressive addition lens;
a reference design data selection unit for selecting reference design data from among said plurality of reference design data stored in said reference design data storage memory in accordance with said prescription data acquired by said prescription data acquisition unit; and
an arrange design unit for processing said selected reference design data on the basis of said prescription data;
wherein said reference design data stored in said reference design data storage memory includes a point group having coordinates of lattice points prepared by dividing the progressive surface as a reference into a lattice form.

2. The system for generating design data as defined in claim 1, further comprising:
a comparison judgment unit for acquiring a measurement result of optical characteristics of the inner surface of the progressive addition lens, and comparing the measurement result with said prescription data to obtain a comparison difference therebetween; and
a compensation design unit for compensating the design data processed by said arrange design unit if the comparison difference is greater than a predetermined value.

3. The system for generating design data as defined in claim 1, further comprising:

an inspection data generation unit for generating inspection data used for the inspection of the inner surface of the progressive addition lens in accordance with said design data.

4. The system of generating design data as defined in claim 1, further comprising:
an eccentricity design unit for rendering an eccentric design center of the surface of said progressive portion after said reference design data is processed by said arrange design unit.

5. The system of generating design data as defined in claim 4, wherein said eccentricity design unit renders the design center of said progressive surface eccentric by a predetermined distance and then compensates a prismatic amount.

6. The system of generating design data as defined in claim 1, further comprising:
a new reference design data generation unit for generating new reference design data and causing said reference design data storage means to store said new reference design data.

7. A method for generating design data of an inner surface progressive addition lens which includes a distance portion and a near portion each having different powers and a progressive portion whose power progressively changes between said distance portion and said near portion, an inner surface of the progressive addition lens having curvatures corresponding to the distance portion, the near portion and the progressive portion, said generation method causing a computer to execute as follows:
acquiring prescription data of the inner surface of said progressive addition lens;
selecting reference design data from reference design data storage storing a plurality of reference design data corresponding to addition power of said inner surface progressive addition lens on the basis of prescription data; and
processing said selected reference design data on the basis of said prescription data;
wherein said reference design data stored in said reference design data storage includes a point group having coordinates of lattice points prepared by dividing the progressive surface as a reference into a lattice form.

8. A computer-readable recording medium recording a program for executing said design data generation method as defined in claim 7.

9. A program for causing a computer to execute said design data generation method as defined in claim 7.

10. The method for generating design data as defined in claim 7, further comprising:
acquiring a measurement result of optical characteristics of the inner surface of the progressive addition lens, and comparing the measurement result with said prescription data to obtain a comparison difference therebetween; and
compensating the design data processed by said arrange design unit if the comparison difference is greater than a predetermined value.

11. The method for generating design data as defined in claim 7, further comprising:
generating inspection data used for the inspection of the inner surface of the progressive addition lens in accordance with said design data.

12. The method of generating design data as defined in claim 7, further comprising:
rendering an eccentric design center of the surface of said progressive portion after said reference design data is processed by said arrange design unit.

13. The system of generating design data as defined in claim 12, wherein said the design center is rendered of said progressive surface eccentric by a predetermined distance and then compensates a prismatic amount.

14. The method of generating design data as defined in claim 1, further comprising:
generating new reference design data and causing said reference design data storage means to store said new reference design data.

* * * * *